April 10, 1951     H. C. LEHDE     2,548,731
REVERSIBLE STEP MOTOR
Filed Nov. 18, 1949
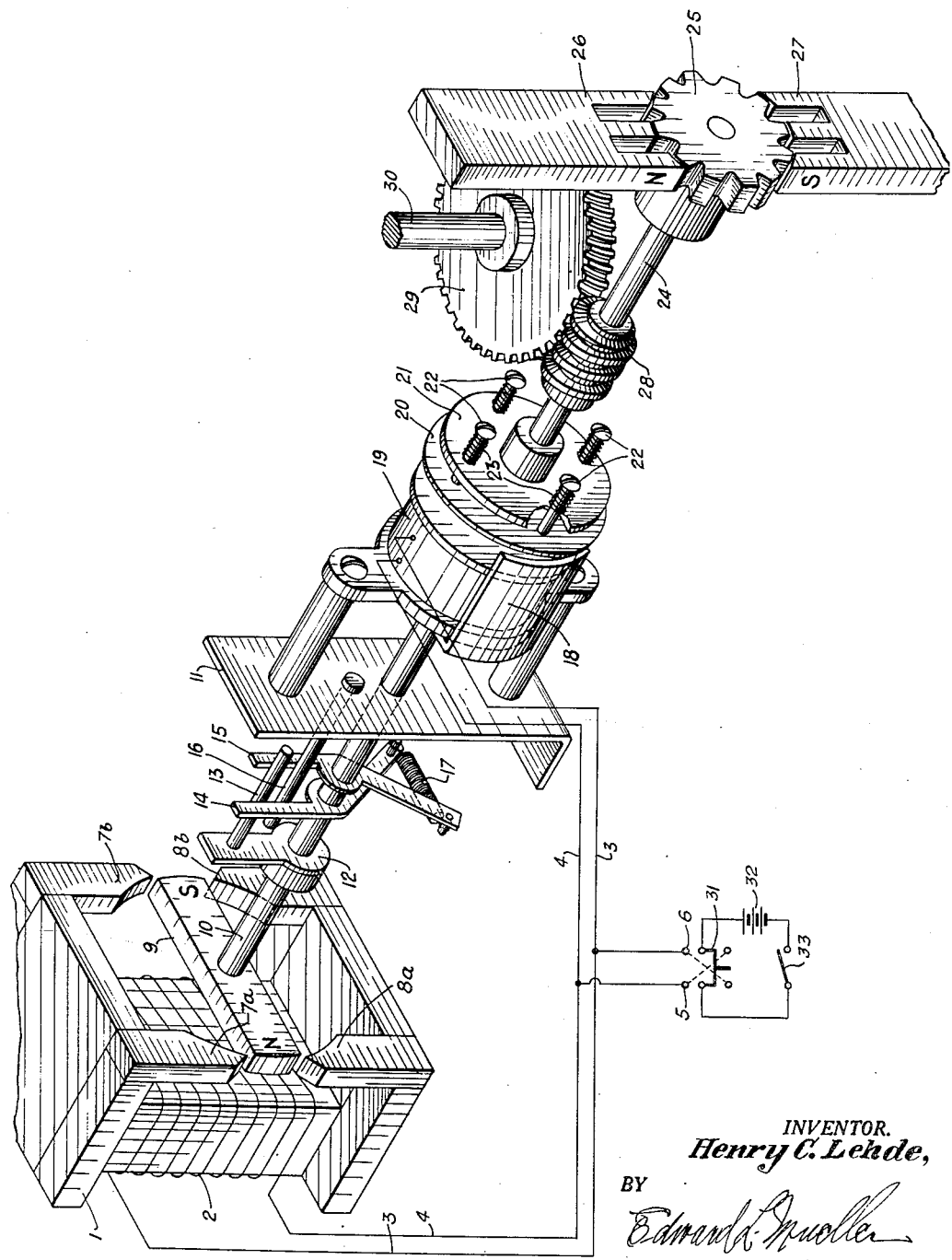
INVENTOR.
*Henry C. Lehde,*
BY
*Edward L. Mueller*
ATTORNEY.

Patented Apr. 10, 1951

2,548,731

UNITED STATES PATENT OFFICE 2,548,731

REVERSIBLE STEP MOTOR

Henry C. Lehde, Brooklyn, N. Y., assignor to Control Instrument Company, Inc., Brooklyn, N. Y., a corporation of New York Application November 18, 1949, Serial No. 128,223

6 Claims. (Cl. 172—36)

This invention relates to improvements in means for producing rotary motion, and has particular reference to a means to produce said motion in discrete steps.

Various methods of producing constant increments of angular rotation have been proposed, some of which, because of the manner in which the rotation is generated, are unsuitable in that the increments of rotation are not constant, and others which produce a constant angular increment of motion are unsuitable, because they are not reversible.

In the present system, it is proposed to produce a constant increment of a shaft's rotation in response to a single pulse of direct current, regardless of the duration of the pulse and determined in direction by the pulse polarity. It is also further proposed that each increment of rotation shall be as nearly the same in angular measurement as the other.

The inventive idea involved is capable of receiving a variety of expressions, one of which, for the purpose of illustration, is shown in the accompanying drawing and described in the specification to follow; but it is to be expressly understood that the drawing and specification are utilized only to facilitate the description of the invention as a whole and not to define the limits thereof, reference being made to the appended claims for that purpose.

The drawing is an isometric view embodying the features of bi-directional incremental rotations of constant magnitude.

As may be seen in the drawing, the mechanism comprises a yoke 1 of magnetic metal, energized by a coil 2, which by way of the leads 3 and 4 may be connected, through the reversing switch 31, to a source of direct current 32 at the terminals 5 and 6. The yoke 1 is provided with the pole tip pairs 7a, 7b and 8a, 8b which pole tips, when said yoke is energized by successive closures of the switch 33, will produce a magnetic field whose direction will be determined entirely by the direction of flow of the current in said coil 2.

The pole tips 7a, 7b and 8a, 8b are so constructed as to provide a circular aperture within which a permanent magnet 9 may rotate. This permanent magnet is affixed to a shaft 10 which is supported by the bearing and supporting plate 11 and is so oriented that it lies in the space between and, when energized, in the field produced by the pole tips. The shaft 10 supports a crank 12 which carries the pin 13 between the pair of opposed, bell crank-shaped floating levers 14 and 15 which are free to rotate on the shaft 10 but which are restrained from motion along the shaft. A fixed pin 16 is supported by the plate 11 which is also positioned between the floating levers 14 and 15, and a spring 17 connects the lower ends of the floating levers 14 and 15 so that, in scissors fashion, they are urged to stop against the fixed pin 16 and to position the pin 13 directly thereabove.

In positioning the pin 13, the crank 12 urged thereby will cause the shaft 10 to be rotated, and thus will position magnet 9 midway between pole tips, this being the position in which said members are shown in the drawing.

A flow of current through coil 2 will cause the pole tips to become magnetized and, depending upon whether the tips are of one polarity or the other, the permanent magnet will rotate clockwise, or counterclockwise, through the small angle necessary for it to align itself so that it presents a pole of opposite polarity to the energized pole tips. Let us suppose that the tips 7a, 7b are made north poles and the tips 8a, 8b are made south poles by current flowing in the coil 2 when the terminal 5 is made positive and terminal 6 negative; the permanent magnet 9 having poles, as labeled in the drawing, will turn, as seen in the drawing, counterclockwise, so that it will align itself with the tips 7b and 8a. If the direction of current and the coil 2 were reversed by making the terminal 5 negative and terminal 6 positive then the tips 7a, 7b would be south poles, the tips 8a, 8b north poles and the permanent magnet 9 will rotate clockwise to position itself in line with the pole tips 7a and 8b. In either event, the crank 12 and the crank pin 13 would be carried along with the shaft 10, and the said pin would displace the lever 14 in the case of a counterclockwise rotation or the lever 15 in the case of a clockwise rotation. The remaining lever would be held by the fixed pin 16, and the motion would stretch the spring 17. When the current ceases to flow, the force of the spring 17, tending to close the levers 14 and 15, will apply a torque by way of the pin 13 and the crank 12 to the shaft 10, and return the magnet 9 to its rest position midway between the de-energized pole tips.

A yoke 18 is attached to the other end of the shaft 10 and positioned to rotate about a coil 19 which coil is supported by legs on the supporting plate 11. Coil 19, when energized, is in parallel with the coil 2, and regardless of the polarity of the applied voltage, will become magnetic and thus attract the clutch plate 20.

The clutch plate 20 is attached to the flange 21 by means of the pins 22 which are freely slidable through said flange and said plate is urged to position itself against said flange by the clutch springs 23 which act to pull said pins through said plate. When coil 19 is energized it becomes magnetic, since the clutch plate 20 is made of a magnetic material, and will attract the said clutch plate against the effort of the springs 23. The yoke 18 projects beyond the coil 19 so that the clutch plate 20 is picked up by the yoke 18 before it can come in contact with coil 19 so that any rotation imparted to the magnet 9 by the energization of the coil 2 simultaneously with the energization of coil 19 with which it is in parallel, will be imparted to the clutch plate 20 and, therefore, to the flange 21.

The flange 21 is made fast to the shaft 24 which terminates in a toothed wheel 25 of soft iron. The toothed wheel 25 rotates in the field of two oppositely poled permanent magnets, or the opposite poles of a single magnet, which poles have been slotted so that they present to the toothed wheel teeth and slots of corresponding size to the teeth and slots of the wheel. Since the reluctance of the gap will be a minimum only when the teeth of the wheel 25 are in line with the teeth of the magnetic poles 26 and 27, the shaft 24 will be able to stop only when the magnetic path through the gap has a minimum reluctance, and the shaft will be turned upon the release of the clutch 20 so that, acting in the nature of a detent, there will be discrete positions which the wheel 25 and, therefore, the shaft 24 can occupy and no others.

Shaft 24 carries a worm gear 28 which is in mesh with the worm wheel 29 causing the rotation of the shaft 30, and any rotation imparted to the shaft 24 will, by way of said worm 28 and wheel 29, be imparted to the shaft 30. Since the shaft 24 is constrained by the detent 25 to discrete increments of rotation, in like manner the shaft 30 will produce like increments of rotation which are related in magnitude to the motions of shaft 24 by the gear ratio of the worm and wheel 28 and 29 on the shaft 30.

A pulse of current applied to the terminals 5 and 6 by the switch 33, regardless of its direction, will produce but one step of rotation of the shafts 24 and 30, and if the angle through which the magnet 9 may rotate corresponds to an integral number of teeth on the detent wheel 25, then the increment of rotation will be fixed and reproduceable for either direction of rotation.

What is claimed is:

1. In a mechanism for producing fixed increments of rotation corresponding in direction to the polarity of an energizing pulse of current, a magnetic element having a polarized field adapted to be energized, a polarized rotatable magnetic means positionable in said field and having a shaft, a magnetic clutch energized simultaneously with the energization of said polarized field, means to so energize said magnetic element and said clutch to rotate said shaft, an output shaft coupled by said clutch to the first named shaft whenever said polarized field and said clutch are simultaneously energized, means coacting with said output shaft to fix the magnitude of its rotation in response to each current pulse, and means for zeroing and for providing a restoring torque to said polarized means and its shaft.

2. In a mechanism for producing fixed increments of rotation corresponding in direction to the polarity of an energizing pulse of current, a magnetic element having a polarized field adapted to be energized, a polarized rotatable magnetic means positionable in said field and having a shaft, a magnetic clutch energized simultaneously with the energization of said polarized field, means to so energize said magnetic element and said clutch to rotate said shaft, an output shaft coupled by said clutch to the first named shaft whenever said polarized field and said clutch are simultaneously energized, a detent coupled to said output shaft and coacting therewith to fix the magnitude of its rotation in response to each current pulse, and spring urged members mounted on said shaft for zeroing and providing a restoring torque to said polarized means and its shaft.

3. In a mechanism for producing fixed increments of rotation corresponding in direction to the polarity of an energizing pulse of current, a magnetic element having a polarized field adapted to be energized, a bar magnet rotatable in said field, a shaft for said bar magnet rotatable therewith and having a neutral position and also a position corresponding to each of the directions of said magnetic field produced by current pulses of opposite polarity, a magnetic clutch adapted for energization simultaneously with the field of said magnetic element, means to so energize said clutch and field to rotate said shaft, an output shaft coupled by said clutch to the first named shaft whenever said clutch and field are simultaneously energized, a detent coupled to said output shaft and coacting therewith to fix the magnitude of rotation in response to each current pulse, and spring urged means coacting with the first named shaft to provide a restoring torque therefor and for said bar magnet.

4. In a mechanism for producing fixed increments of rotation corresponding in direction to the polarity of an energizing pulse of current, a magnetic element having a polarized field adapted to be energized, a bar magnet rotatable in said field, a shaft for said bar magnet rotatable therewith and having a neutral position and also a position corresponding to each of the directions of said magnetic field produced by current pulses of opposite polarity, a magnetic clutch adapted for energization simultaneously with the field of said magnetic element, means to so energize said clutch and field to rotate said shaft, an output shaft coupled by said clutch to the first named shaft whenever said clutch and field are simultaneously energized, a detent coupled to said output shaft and coacting therewith to fix the magnitude of rotation in response to each current pulse, means including a pair of opposed levers rotatable in opposite directions about the first named shaft, a spring connecting said levers, and a member carried by said first named shaft and engageable with said levers to rotate the same in opposite directions so as to provide a zero position and restoring torque to said bar magnet.

5. In a mechanism for producing fixed increments of rotation corresponding in direction to the polarity of an energizing pulse of current, a magnetic element having a polarized field adapted to be energized, a bar magnet rotatable in said field, a shaft for said bar magnet rotatable therewith and having a neutral position and also a position corresponding to each of the directions of said magnetic field produced by current pulses of opposite polarity, a magnetic clutch adapted for energization simultaneously with the field of said magnetic element, means to so energize said clutch and field to rotate said shaft, an output shaft coupled by said clutch to the first named shaft whenever said clutch and field are simultaneously energized, means providing discrete stable positions to said output shaft, said means comprising a slotted magnetic pole element and a toothed wheel coupled to said output shaft and positionable between the poles of said pole element, and means for zeroing and for providing a restoring torque to the first named shaft and said bar magnet.

6. In a mechanism for producing fixed increments of displacement corresponding in direction to the polarity of an energizing pulse of current, an element forming a polarized magnetic field adapted to be energized, a polarized magnetic member displaceable in said field, a magnetic clutch having connection with said magnetic member and simultaneously energized with said field, means to so energize said clutch and field, output means for said magnetic clutch displaced whenever said clutch and field are simultaneously energized, means coacting with said output means to fix the magnitude of its displacement, and means to apply a position restoring force to said polarized magnetic member after each displacement thereof.

HENRY C. LEHDE.

REFERENCES CITED

The following references are of record in the file of this patent:

UNITED STATES PATENTS

| Number | Name | Date |
| --- | --- | --- |
| 1,603,646 | Sperry | Oct. 19, 1926 |
| 2,267,606 | Goldstine | Dec. 23, 1941 |
| 2,432,600 | Werner et al. | Dec. 16, 1947 |
| 2,444,566 | Hennessy et al. | July 6, 1948 |